(12) United States Patent
Breton et al.

(10) Patent No.: US 7,572,325 B2
(45) Date of Patent: Aug. 11, 2009

(54) INK CARRIERS, PHASE CHANGE INKS INCLUDING SAME AND METHODS FOR MAKING SAME

(75) Inventors: Marcel P. Breton, Mississauga (CA); Adela Goredema, Mississauga (CA); Christine E. Bedford, Burlington (CA); Christopher Wagner, Toronto (CA); Stephan Drappel, Toronto (CA); Caroline Turek, Hamilton (CA); Raymond W. Wong, Mississauga (CA); Nadia Edun, Scarborough (CA)

(73) Assignee: Xerox Corporation, Norwalk, CT (US)

( * ) Notice: Subject to any disclaimer, the term of this patent is extended or adjusted under 35 U.S.C. 154(b) by 520 days.

(21) Appl. No.: 11/291,315

(22) Filed: Nov. 30, 2005

(65) Prior Publication Data

US 2007/0119338 A1    May 31, 2007

(51) Int. Cl.
    *C09D 13/00* (2006.01)
(52) U.S. Cl. .................................. 106/31.29
(58) Field of Classification Search ................. 347/103; 528/310; 106/31.61; 428/195, 195.1; 430/108.23; 523/160
    See application file for complete search history.

(56) References Cited

U.S. PATENT DOCUMENTS

| | | |
|---|---|---|
| 3,157,633 A | 11/1964 | Kuhn |
| 3,927,044 A | 12/1975 | Foster et al. |
| 3,994,835 A | 11/1976 | Wolf et al. |
| 4,102,644 A | 7/1978 | Hauser et al. |
| 4,113,721 A | 9/1978 | Hauser et al. |
| 4,132,840 A | 1/1979 | Hugl et al. |
| 4,137,243 A | 1/1979 | Farmer |
| 4,170,564 A | 10/1979 | Brendle |
| 4,284,729 A | 8/1981 | Cross et al. |
| 4,507,407 A | 3/1985 | Kluger et al. |
| 4,640,690 A | 2/1987 | Baumgartner et al. |
| 4,732,570 A | 3/1988 | Baumgartner et al. |
| 4,751,254 A | 6/1988 | Kluger et al. |
| 4,761,502 A | 8/1988 | Kluger et al. |
| 4,775,748 A | 10/1988 | Kluger et al. |
| 4,812,141 A | 3/1989 | Baumgartner et al. |
| 4,846,846 A | 7/1989 | Rekers et al. |
| 4,871,371 A | 10/1989 | Harris |
| 4,889,560 A | 12/1989 | Jaeger et al. |
| 4,889,761 A | 12/1989 | Titterington et al. |
| 4,912,203 A | 3/1990 | Kluger et al. |
| 4,978,362 A | 12/1990 | Kluger et al. |
| 5,043,013 A | 8/1991 | Kluger et al. |
| 5,059,244 A | 10/1991 | King et al. |
| 5,145,518 A | 9/1992 | Winnik et al. |
| 5,146,087 A | 9/1992 | VanDusen |
| 5,149,800 A | 9/1992 | Kluger et al. |
| 5,169,436 A * | 12/1992 | Matrick .................... 106/31.58 |
| 5,177,200 A | 1/1993 | Kluger et al. |
| 5,195,430 A | 3/1993 | Rise |
| 5,202,265 A | 4/1993 | LaMora |
| 5,208,630 A | 5/1993 | Goodbrand et al. |
| 5,221,335 A | 6/1993 | Williams et al. |
| 5,225,900 A | 7/1993 | Wright |
| 5,231,135 A | 7/1993 | Machell et al. |
| 5,256,193 A | 10/1993 | Winnik et al. |
| 5,270,363 A | 12/1993 | Kluger et al. |
| 5,271,764 A | 12/1993 | Winnik et al. |
| 5,275,647 A | 1/1994 | Winnik |
| 5,286,286 A | 2/1994 | Winnik et al. |
| 5,290,921 A | 3/1994 | Moody et al. |
| 5,301,044 A | 4/1994 | Wright |
| 5,372,852 A | 12/1994 | Titterington et al. |
| 5,378,574 A | 1/1995 | Winnik et al. |
| 5,385,803 A | 1/1995 | Duff et al. |
| 5,397,388 A * | 3/1995 | Fujioka .................... 106/31.29 |
| 5,496,879 A | 3/1996 | Griebel et al. |
| 5,543,177 A | 8/1996 | Morrison et al. |
| 5,574,078 A * | 11/1996 | Elwakil ...................... 523/161 |
| 5,621,022 A | 4/1997 | Jaeger et al. |
| 5,645,632 A | 7/1997 | Pavlin |
| 5,731,398 A | 3/1998 | Ragsdale et al. |
| 5,780,528 A | 7/1998 | Titterington et al. |
| 5,783,657 A | 7/1998 | Pavlin et al. |
| 5,863,319 A * | 1/1999 | Baker et al. ............... 106/31.29 |
| 5,919,839 A | 7/1999 | Titterington et al. |
| 5,998,570 A | 12/1999 | Pavlin et al. |
| 6,111,055 A | 8/2000 | Berger et al. |
| 6,174,937 B1 | 1/2001 | Banning et al. |
| 6,221,137 B1 | 4/2001 | King et al. |
| 6,235,098 B1 * | 5/2001 | Maekawa et al. ......... 106/31.61 |
| 6,472,523 B1 | 10/2002 | Banning et al. |
| 6,476,219 B1 | 11/2002 | Duff et al. |
| 6,576,747 B1 | 6/2003 | Carlini et al. |
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,696,552 B2 | 2/2004 | Mayo et al. |
| 6,713,614 B2 | 3/2004 | Carlini et al. |

(Continued)

FOREIGN PATENT DOCUMENTS

DE          4205713AL          2/1992

(Continued)

*Primary Examiner*—Melvin C Mayes
*Assistant Examiner*—Stefanie Cohen
(74) *Attorney, Agent, or Firm*—Marger Johnson & McCollom, PC

(57) ABSTRACT

Disclosed is an ink carrier comprising (A) an antioxidant mixture comprising (a) a hindered phenol antioxidant, and (b) a hindered amine antioxidant, (B) a polyalkylene wax, (C) a functional wax, and (D) an ester-terminated amide. The low polarity ink carrier is substantially resistant to phase separation, has excellent thermal stability, resists autocatalytic degradation of the ink composition and a substantial color shift upon standing, and provides enhanced humidity resistance. This ink carrier can be combined with a colorant to produce an ink composition.

23 Claims, No Drawings

U.S. PATENT DOCUMENTS

| | | |
|---|---|---|
| 6,726,755 B2 | 4/2004 | Titterington et al. |
| 6,755,902 B2 | 6/2004 | Banning et al. |
| 6,858,070 B1 | 2/2005 | Wong et al. |
| 6,860,930 B2 | 3/2005 | Wu et al. |
| 6,860,931 B2 | 3/2005 | Wu et al. |
| 6,989,052 B1 * | 1/2006 | Wu et al. .................. 106/31.29 |
| 2004/0102540 A1 * | 5/2004 | Jaeger et al. ................. 523/160 |
| 2007/0012217 A1 * | 1/2007 | Goredema et al. ........ 106/31.29 |

FOREIGN PATENT DOCUMENTS

| | | |
|---|---|---|
| DE | 4205636AL | 8/1993 |
| WO | WO98/17705 | 4/1998 |

* cited by examiner

INK CARRIERS, PHASE CHANGE INKS INCLUDING SAME AND METHODS FOR MAKING SAME

BACKGROUND

Disclosed herein are ink carriers, phase change inks and methods for making same. More specifically, disclosed herein are ink carriers including (A) an antioxidant mixture comprising (a) a hindered phenol antioxidant, and (b) a hindered amine antioxidant, (B) a polyalkylene wax, (C) a functional wax, and (D) an ester-terminated amide, and phase change inks including such ink carriers which can be used in direct and indirect printing processes. One embodiment of this disclosure is directed to a phase change ink composition comprising (1) a colorant and (2) an ink carrier which comprises (A) an antioxidant mixture comprising (a) a hindered phenol antioxidant, and (b) a hindered amine antioxidant, (B) a polyalkylene wax, (C) a functional wax, and (D) an ester-terminated amide, the low polarity ink carrier being substantially resistant to phase separation, having excellent thermal stability, resisting autocatalytic degradation of the ink composition and a substantial color shift upon standing, and providing enhanced humidity resistance, said low polarity ink having a substantially low surface energy. Another embodiment is directed to a method which comprises (a) incorporating into an ink jet printing apparatus a phase change ink composition comprising (1) the low polarity ink carrier described above, and (2) a colorant; (b) melting the ink; (c) causing droplets of the melted ink to be ejected in an imagewise pattern; and (d) transferring the ink in the imagewise pattern to a final recording substrate.

In general, phase change inks (sometimes referred to as "hot melt inks") are in the solid phase at ambient temperature, but exist in the liquid phase at the elevated operating temperature of an ink jet printing device. At the printhead operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with inks that are liquid at room temperature are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known and are described in U.S. patent application Ser. No. 10/881,047, now U.S. Pat. No. 6,989,052 the disclosure of which is totally incorporated herein by reference.

U.S. Pat. Nos. 5,783,657, 5,998,570 and WO 98/17704, (Pavlin et al), the disclosures of which are totally incorporated herein by reference, disclose a low molecular weight, ester-terminated polyamide that may be blended with a liquid hydrocarbon to form a transparent composition having gel consistency. The ester-terminated polyamide is prepared by reacting "x" equivalents of dicarboxylic acid wherein at least 50 percent of those equivalents are from polymerized fatty acid, "y" equivalents of diamine such as ethylene diamine, and "z" equivalents of monoalcohol having at least 4 carbon atoms. The stoichiometry of the reaction mixture is such that $0.9 \leq \{x/(y+z)\} \leq 1.1$ and $0.1 \leq \{z/(y+z)\} \leq 0.7$. The reactants are heated until they reach reaction equilibrium.

U.S. Pat. No. 6,111,055 (Berger, et al), the disclosure of which is totally incorporated herein by reference, discloses an ester terminated dimer acid-based polyamide which is blended with a solvent to form a gel. The solvent may be flammable, and a wick may be added to the resulting gel to form a candle. The said ester terminated dimeracid-based polyamide is prepared by thermal condensation of a diacid, a diamine and a monoalcohol.

A need remains for improved phase change inks, and more specifically, low energy solid inks which permit phase change ink jet printers to perform at more moderate operating conditions than with conventional phase change inks. For example, a need exists for phase change inks which can be jetted at temperature lower than conventional jetting temperature as described below. Also, there is a need for phase change inks having enhanced humidity resistance. In addition, a need remains for phase change inks having low surface energy and improved thermal stability. A need also remains for certain ink carrier components and compositions which reduce the rate of oxidation at high temperature, thereby minimizing degradation of the ink components, and can delay the onset of oxidation itself. Further, a need remains for phase change inks that maximize long term stability and provide improved compatibility of the ink components. Additionally, a need remains for phase change inks that print successfully on paper and transparency stock. In addition, there is a need for phase change inks that generate prints with good performance in automatic document feeders as a result of their low surface energy.

SUMMARY

Many phase change inks currently being used in solid ink jet piezoelectric printers require high jetting temperatures (about 140 degrees C.) and long warm up times. The images currently produced by these inks can also, in many instances, exhibit poor scratch resistance and image permanence.

Disclosed herein is an ink carrier which is used in forming a phase change ink composition, the ink carrier comprising (A) an antioxidant mixture comprising (a) a hindered phenol antioxidant for controlling the onset of oxidation/degradation, and (b) a hindered amine antioxidant for controlling the rate of oxidation/degradation, (B) a polyalkylene wax, (C) a functional wax, and (D) an ester-terminated amide, which is substantially resistant to phase separation and has excellent thermal stability which resists autocatalytic degradation of the ink composition and a substantial color shift upon standing, and providing enhanced humidity resistance, said low polarity ink having a substantially low surface energy. Another embodiment of this disclosure is directed to a method which comprises (a) incorporating into an ink jet printing apparatus an ink composition comprising (1) the above-described ink carrier and (2) a colorant; (b) melting the ink; and (c) causing droplets of the melted ink to be ejected in an imagewise pattern onto a substrate.

DETAILED DESCRIPTION

An ink carrier can be provided which comprises (A) an antioxidant mixture comprising (a) a hindered phenol antioxidant, and (b) a hindered amine antioxidant, (B) a polyalkylene wax, (C) a functional wax, and (D) an ester-terminated amide. An ink composition of the present disclosure, which can be referred to as a phase change ink, can comprise (1) the above-described ink carrier and (2) a colorant. The ink carrier can be of low polarity and substantially resistant to phase separation. It can also have excellent thermal stability which substantially resists autocatalytic degradation of the ink composition and withstands substantial color shift upon standing. It can also provide enhanced humidity resistance. The ink can have a substantially low surface energy.

The term substantially resistant to phase separation can mean that the ink in one embodiment can remain substantially homogeneous upon standing at the jetting temperature for at least about 24 hours, and in another embodiment for at least about 48 hours. Phase separation can also be defined by observing a corresponding dye-less ink formulation before and after aging at the jetting temperature in an oven for a period of about 48 hours. The dye-less formulation can show substantially no phase separation. Further evidence of phase separation is obtained by evaluating the filterability of a known aliquot of the ink (with colorant) through a micron size filter before and after aging showing that there is no significant variation in filtration time between the two samples.

The low polarity of the ink vehicle can be defined by determining its solubility parameter and that of the ink components. The ink formulation in one embodiment comprises at least about 85% by weight, in another embodiment at least about 90% by weight, and in a further embodiment at least about 95% by weight of the ink carrier, although the % by weight of the ink carrier can be outside of these ranges. Moreover, the ink carrier can have a total solubility parameter (including dispersive, polar and hydrogen bonding components) in one embodiment of equal to or less than about 21 $(MPa)^{0.5}$, in another embodiment equal to or less than about 19 $(MPa)^{0.5}$, and in a further embodiment equal to or less than about 17 $(MPa)^{0.5}$, although the total solubility parameter can be outside of these ranges. The value for the polar component of the total solubility parameter of the components that make up all together in one embodiment at least 85 percent by weight of the ink vehicle, in another embodiment at least 90 percent by weight of the ink vehicle, and in another embodiment at least 95 percent by weight of the ink vehicle, in one embodiment is equal to or less than about 2 $(MPa)^{0.5}$, in another embodiment is equal to or less than about 1.5 $(MPa)^{0.5}$, and in a further embodiment is equal to or less than about 1 $(MPa)^{0.5}$, although the values of the polar component of the solubility parameters can be outside of these ranges.

The subject phase change inks can also have a relatively low surface energy. Typically these inks can have a surface energy which in one embodiment can be equal to or less than about 33 dynes/cm, in another embodiment equal to or less than about 30 dynes/cm, in a further embodiment equal to or less than about 28 dynes/cm, and in another further embodiment equal to or less than about 25 dynes/cm, although the surface energy can be outside of these ranges.

The ink can be a solid ink with enhanced humidity resistance, improved thermal stability and excellent print quality on plain paper. These properties can be related to an excellent compatibility of the ink components. Accordingly, antioxidants can be selected for their compatibility with one or more of the ink components. In one embodiment the antioxidants can have melting points that are at or below the processing temperature used for the formation of the ink. This can result in an ease of dissolution of the antioxidant in the ink vehicle, an increased solubility at the jetting temperature and/or the ability to use a higher concentration of antioxidants. All of these factors can enable the formulation of inks with improved thermal stability having a minimum phase separation.

The antioxidant blend can include a substantially low concentration of a hindered amine having a melting temperature in one embodiment of equal to or less than about 250 degrees C., in another embodiment of equal to or less than about 160 degrees C., and in a further embodiment of equal to or less than about 125 degrees C., although the temperature can be outside of these ranges. This can facilitate a reduced rate of oxidation at high temperature.

The hindered amine antioxidant in one embodiment can be hydrophobic. The presence of this property can improve compatibility with the ink disclosed herein. It can also resist exhibiting a substantial color shift upon standing.

The hindered phenol antioxidant can have a melting temperature equal to or less than about 250 degrees C., in another embodiment of equal to or less than about 160 degrees C., and in a further embodiment of equal to or less than about 125 degrees C., although the temperature can be outside of these ranges. The hindered phenol can also maximize thermal stability with a major effect being delaying the onset of degradation.

The hindered phenol antioxidant can be present in a relatively high concentration. A high concentration of hindered phenol antioxidant maximizes long term thermal stability by delaying the onset of the oxidation itself. The hindered phenol antioxidant is present in the ink in any desired or effective amount, in one embodiment of at least about 0.01 percent by weight of the ink carrier, in another embodiment of at least about 0.5 percent by weight of the ink carrier, and in yet another embodiment of at least about 1.5 percent by weight of the ink carrier, and in one embodiment of equal to or less than about 4.0 percent by weight of the ink carrier, in another embodiment of equal to or less than about 3.0 percent by weight of the ink carrier, and in yet another embodiment of equal to or less than about 2.5 percent by weight of the ink carrier, although the amount can be outside of these ranges.

Examples of suitable hindered phenol antioxidants include those of general formula

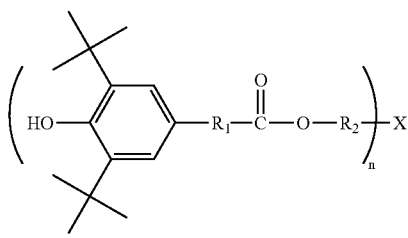

Wherein $R_1$ and $R_2$ each, independently of the other, can be an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom, X can be a heteroatom such as oxygen, nitrogen, sulfur, silicon, phosphorus, boron or an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom.

Specific examples of suitable hindered phenol antioxidants include the following antioxidants commercially available from Albemarle; ETHANOX® 310 where n=4, $R_1$=—CH$_2$CH$_2$—, $R_2$=CH$_2$—, X=—CH$_2$— (also available from CIBA as Irganox 1010), ETHANOX® 376 where n=1, $R_1$=—CH$_2$CH$_2$—, $R_2$=CH$_2$—, X=—C$_{18}$H$_{37}$ (Also available from CIBA as IRGANOX®1076) and the like. Also commercially available from Ciba Specialty Chemicals are IRGANOX® 1035, where n=2, $R_1$=$R_2$=—CH$_2$CH$_2$—, X=S (also available from Myza Inc. as BNX® 1035). Other examples of suitable hindered phenol antioxidants include those of the general formula:

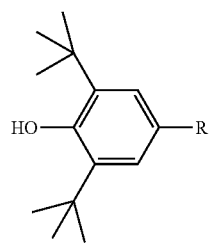

Wherein R can be an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom.

Specific examples include the following antioxidants commercially available from Albemarle; ETHANOX® 703 where R=—CH$_2$N(CH$_3$)$_2$, ETHANOX® 330 (Also available from CIBA as IRGANOX® 1330) with the formula shown below:

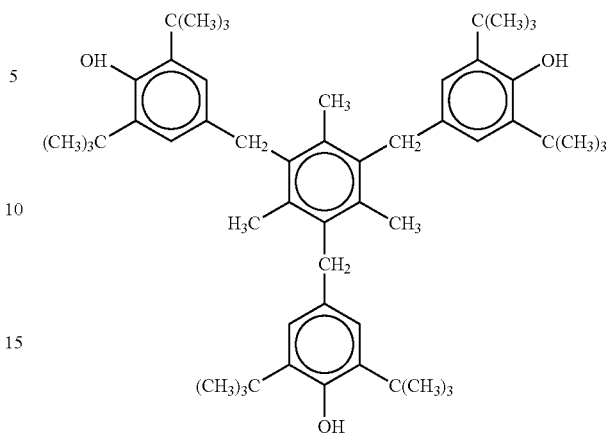

ETHANOX® 314 with the formula shown below:

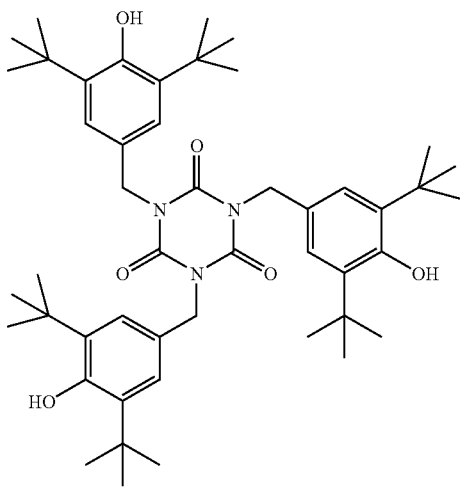

ETHANOX® 703 with the formula shown below:

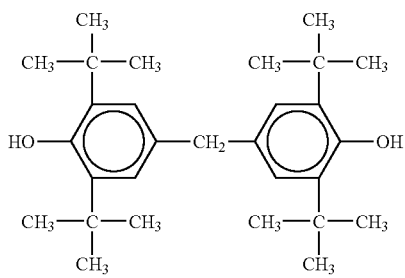

Other examples of hindered phenol antioxidants include Naurgard 76(available from Crompton) where R=—(CH$_2$)$_2$CO—O(CH$_2$)$_{17}$CH$_3$ (also available from Mayza Inc. as BNX® 1076), IRGANOX® 1090 (commercially available from Ciba) with the formula shown below:

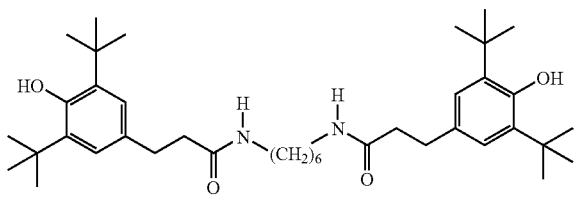

Other suitable hindered phenol antioxidants include the following antioxidants commercially available from Mayzo Inc.

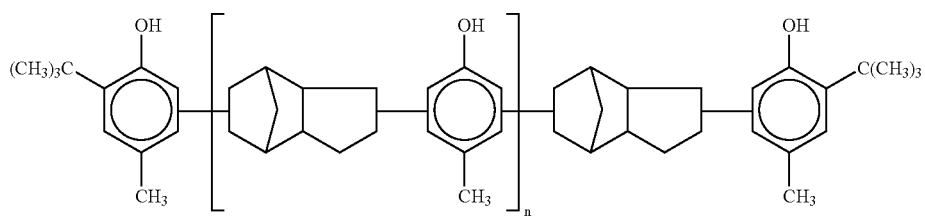

BNX® 8000

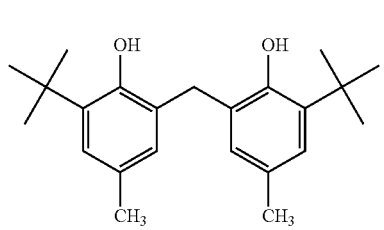

BNX® 2246

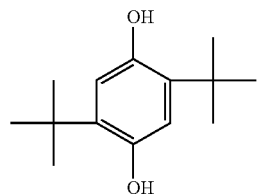

BNX® DTBHQ

The antioxidant blend also includes a relatively low concentration of hindered amine for providing reduced rate of oxidation at high temperature. As stated above, this minimizes autocatalytic degradation of the ink components. The hindered amine antioxidant is present in the ink in any desired or effective amount, in one embodiment of at least about 0.001 percent by weight of the ink carrier, in another embodiment of at least about 0.05 percent by weight of the ink carrier, and in yet another embodiment of at least about 0.10 percent by weight of the ink carrier, and in one embodiment of equal to or less than about 0.50 percent by weight of the ink carrier, in another embodiment of equal to or less than about 0.25 percent by weight of the ink carrier, and in yet another embodiment of equal to or less than about 0.15 percent by weight of the ink carrier, although the amount can be outside of these ranges.

Examples of suitable hindered amine antioxidants include those of general formula

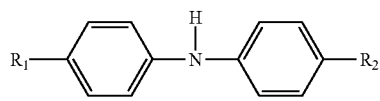

Wherein $R_1$ and $R_2$ each, independently of the other, can be a hydrogen atom or an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom.

Specific examples of suitable hindered amine antioxidants include the following antioxidants commercially available from Crompton; NAUGUARD® 445 where $R_1=R_2=C(CH_3)_2Ph$, NAUGUARD® 635 where $R_1=R_2=\!-\!CH(CH_3)Ph$, NAUGUARD® PS-30 where $R_1=C_4$ or $C_8$, $R_2=C_4$ or $C_8$ and the like.

Also suitable are the TINUVIN® series of light stabilizers (commercially available from Ciba Specialty Chemicals) such as TINUVIN® 144 with the following structure;

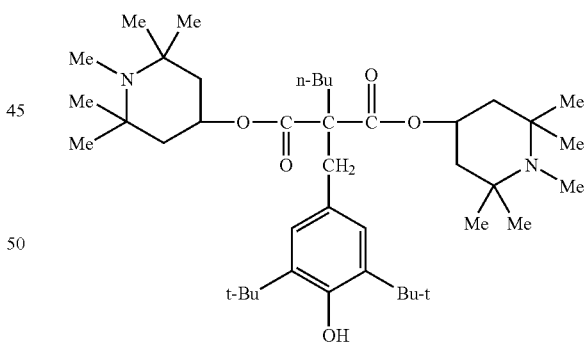

TINUVIN® 292 with the following structure;

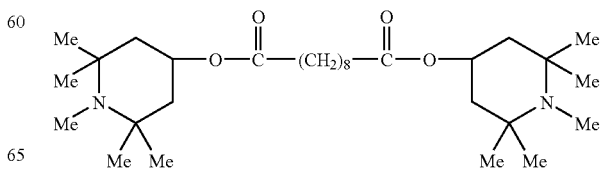

TINUVIN® 770 with the following structure;

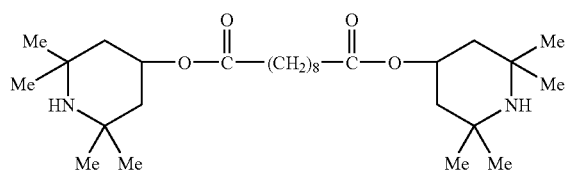

TINUVIN® 111B and TINUVIN® 622FB.

In one specific embodiment, a weight ratio of hindered phenol and hindered amine can be maintained. Thus, the weight ratio of hindered phenol to hindered amine in one embodiment is at least about 2, in another embodiment at least about 5, and in a further embodiment at least about 10, and in one embodiment is no more than about 40, in another embodiment is no more than about 20, and in a further embodiment is no more than about 15, although the weight ratio can be outside of these ranges. The total amount of antioxidant in the ink carrier can be in the weight ratio in one embodiment equal to or less than about 5 weight percent, in another embodiment equal to or less than about 4 weight percent, and in a further embodiment equal to or less than about 2 weight percent, although the weight ratio can be outside of these ranges.

In addition, the ink disclosed herein can comprise a rosin ester resin, a liquid or solid plasticizer, and/or a branched polyamide. Optionally, the ink of this ink carrier may also contain UV stabilizers.

A polyalkylene wax, such as a polyethylene wax, a polypropylene wax, mixtures thereof, or the like can also be included in the ink carrier. The polyalkylene wax(es) is present in the ink carrier in any desired or effective amount, in one embodiment of at least about 25 percent by weight of the ink carrier, in another embodiment of at least about 30 percent by weight of the ink carrier, and in yet another embodiment of at least about 35 percent by weight of the ink carrier, and in one embodiment equal to or less than about 65 percent by weight of the ink carrier, in another embodiment equal to or less than about 55 percent by weight of the ink carrier, and in yet another embodiment equal to or less than about 45 percent by weight of the ink carrier, although the amount can be outside of these ranges. Examples of suitable polyalkylene waxes include POLYWAX® 500 (commercially available from Baker Petrolite) and distilled POLYWAX® 500, preferably having a viscosity at the jetting temperature of about 110 degree C. of about 10% to about 100% higher than the viscosity of the undistilled POLYWAX® 500, POLYWAX® 400 and distilled POLYWAX® 400 from Baker Petrolite, VYBAR® 103 and VYBAR® 253 from Baker Petrolite, POLYWAX® 655 and mixtures thereof. Higher molecular weight POLYWAX® materials are also suitable. When the molecular weight of the polyalkylene wax is in the range of 500 to 600 g/mole, in one embodiment the polydispersity can be equal to or less than about 1.1, and in another embodiment equal to or less than about 1.05, and in a further embodiment equal to or less than about 1.01, although the polydispersity can be outside of these ranges.

Functional wax(es) can also be included in the ink carrier. In an embodiment herein the functional wax can be an alcohol wax, or a blend thereof. The alcohol wax(es) can be present in the ink carrier in any desired or effective amount, in one embodiment of at least about 20 percent by weight of the ink carrier, in another embodiment of at least about 25 percent by weight of the ink carrier, and in yet another embodiment of at least about 30 percent by weight of the ink carrier, and in one embodiment of equal to or less than about 65 percent by weight of the ink carrier, in another embodiment of equal to or less than about 55 percent by weight of the ink carrier, and in yet another embodiment of equal to or less than about 45 percent by weight of the ink carrier, although the amount can be outside of these ranges.

In an embodiment, the blend of alcohol waxes can be a blend of mono- di-, tri- or tetra-alcohol waxes. The relative proportions of each of the alcohol waxes can be provided so as to maintain a predetermined hydroxyl number for the ink carrier. The hydroxyl number (ASTM E-222-00 mod.) of the ink carrier is in one embodiment of at least about 20, in another embodiment of at least about 25, and in yet another embodiment of at least about 35, and in one embodiment of no more than about 100, in another embodiment of no more than about 80, and in yet another embodiment of no more than about 50, although the hydroxyl number can be outside of these ranges. The alcohol wax(es) in one embodiment can have a melting point of at least about 50 degrees C., in another embodiment of at least about 60 degrees C., and in a further embodiment of at least about 70 degrees C., in one embodiment equal to or less than about 110 degree C., in another embodiment equal to or less than about 105 degree C., and in a further embodiment equal to or less than about 100 degree C., although the melting point can be outside of these ranges.

Examples of suitable alcohol waxes include UNILIN® 350 and UNILIN® 425 (commercially available from Baker Petrolite), distilled functional waxes, the viscosity of which at the jetting temperature in one embodiment can be from about 5 to about 50% higher than the non-distilled functional wax (es), and a 1-docosanol wax commercially available from Aldrich. Mono functional waxes which can be employed herein are the waxes of 1-tetradecanol, 1-pentadecanol, 1-hexadecanol, 1-heptadecanol, 1- octadecanol, 1-nonadecanol, 1-eicosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol. Also suitable are Guerbet alcohols such as 2-tetradecyl 1-octadecanol, 2-hexadecyl 1 -eicosanol, 2-octadecyl 1-docosanol, 2-nonadecyl 1-tricosanol, 2-eicosyl tetracosanol, and mixtures thereof. Di-functional waxes can include the waxes of diols such as 1,8-octanediol, 1,9-nonanediol, 1,10-decanediol, 1,12-dodecanediol, 1,13-tridecanediol, 1,14-tetradecanediol, 1,15-pentadecanediol, 1,16-hexandecanediol, 1,17-heptadecanediol, 1,18-octadecanediol, 1,19-nonadecanediol, 1,20-eicosanediol, 1,22-docosanediol, 1,25-pentacosanediol, and mixtures thereof. Other polyhydric alcohols that can be used in the ink are trimethylolpropane, pentaerythritol, neopentylglycol, mannitol, sorbitol, and mixtures thereof, including mixtures with the above mentioned mono- and di-functionalized alcohols.

The polyalkylene wax can be present in the ink in an amount of at least about 35% by weight of the ink carrier, in another embodiment an amount of at least about 40% by weight of the ink carrier, and in yet another embodiment of at least about 45% by weight of the ink carrier, and in one embodiment of equal to or less than about 65% by weight of the ink carrier, in another embodiment of equal to or less than about 60% by weight of the ink carrier, and in yet another embodiment of equal to or less than about 55% by weight of the ink carrier, although the amount can be outside of these ranges. Additionally, the functional wax can be present in the polyalkylene containing ink in an amount of at least about 35% by weight of the ink carrier, in another embodiment an amount of at least about 40% by weight of the ink carrier, and in yet another embodiment of at least about 45% by weight of the ink carrier, and in one embodiment of equal to or less than about 65% by weight of the ink carrier, in another embodiment of equal to or less than about 60% by weight of the ink carrier, and in yet another embodiment equal to or less than about 55% by weight of the ink carrier, although the amount can be outside of these ranges.

The polyalkylene wax and alcohol wax can be employed in weight proportion in one embodiment of at least about 0.35, in another embodiment at least about 0.40, and in a further embodiment at least about 0.45, and in one embodiment equal to or less than 0.65, in another embodiment equal to or less than 0.60, and in a further embodiment equal to or less than 0.55, although the proportion of each component can be outside of these ranges.

An ester-terminated amide can be employed in the ink carrier disclosed herein. Examples of suitable ester-amide compounds and the preparation thereof are disclosed in, for example, U.S. Pat. Nos. 5,863,319, 5,645,632, and 5,783,657, the disclosures of each of which are totally incorporated herein by reference. Suitable ester-amides are also commercially available as, for example, UNI-REZ® 2980 and UNI-CLEAR® 80 and 100 (commercially available from Arizona Chemical), and the like.

In one specific embodiment, the ester-amide compound has a melting point of at least about 50° C., although the melting point can be outside of this range. In another specific embodiment, the ester-amide compound has a melting point equal to or less than about 160° C., although the melting point can be outside of this range. In a further specific embodiment, the ester-amide compound has a viscosity at about 140° C. of at least about 20 cps, although the viscosity can be outside of this range. In still another specific embodiment, the ester-amide compound has a viscosity at about 140° C. equal to or less than about 400 cps, although the viscosity can be outside of this range.

The ester-amide can be present in the ink carrier in one embodiment at least about 0.5% by weight, in another embodiment at least about 3% by weight, and in yet another embodiment at least about 6% by weight, and in one embodiment equal to or less than about 20% by weight, in another embodiment equal to or less than about 15% by weight, and in yet another embodiment equal to or less than about 10% by weight, although the amount can be outside of these ranges.

A rosin ester resin, mixtures thereof, or the like can also be included in the ink carrier. The rosin ester resin is present in the ink carrier in one embodiment of at least about 0.5% by weight of the ink carrier, in another embodiment of at least about 2% by weight of the ink carrier, and in yet another embodiment of at least about 3% by weight of the ink carrier, and in one embodiment of equal to or less than about 20% by weight of the ink carrier, in another embodiment equal to or less than about 15% by weight of the ink carrier, and in yet another embodiment equal to or less than about 10% by weight of the ink carrier, although the amount can be outside of these ranges. Examples of suitable rosin ester resins include PINECRYSTAL® KE-100 (commercially available from Arakawa) and the like.

A plasticizer, which can be either a solid or liquid plasticizer, such as benzyl phthalates, triaryl phosphate esters, pentaerythritol tetrabenzoate, dialkyl adipate, dialkyl phthalates, dialkyl sebacate, alkyl benzyl phthalates, ethylene glycol monostearate, glycerol monostearate, propylene glycol monostearate, dicyclohexyl phthalate, diphenyl isophthalate, triphenyl phosphate, dimethyl isophthalate, and mixtures thereof, or the like can also be included in the ink carrier. The plasticizer can be present in the ink carrier in one embodiment of at least about 0.05% by weight of the ink carrier, in another embodiment of at least about 1% by weight of the ink carrier, and in yet another embodiment of at least about 2% by weight of the ink carrier, and in one embodiment equal to or less than about 15% by weight of the ink carrier, in another embodiment equal to or less than about 10% by weight of the ink carrier, and in yet another embodiment equal to or less than about 5% by weight of the ink carrier, although the amount can be outside of these ranges. Examples of suitable plasticizers include SANTICIZER® 278, SANTICIZER® 154, SANTICIZER®160, SANTICIZER® 261 (commercially available from Monsanto), and the like.

Fatty amides, such as monoamides, diamides, triamides and tetraamides, mixtures thereof, and the like can also be included in the ink carrier. The amide can be present in one embodiment in an amount of at least about 1% by weight of the ink carrier, in another embodiment of at least about 2% by weight of the ink carrier, and in yet another embodiment of at least about 3% by weight of the ink carrier, and in one embodiment equal to or less than about 30% by weight of the ink carrier, in another embodiment equal to or less than about 15% by weight of the ink carrier, and in yet another embodiment equal to or less than about 5% by weight of the ink carrier, although the amount can be outside of these ranges. Examples of suitable amides include stearyl stearamide, a tetra amide resin obtained from the reaction of one equivalent of dimer acid with two equivalents of ethylene diamine and UNICID® 700 (commercially available from Baker Petrolite, a carboxylic acid derivative of a long chain alcohol), prepared as described in Example 1 of U.S. Pat. No. 6,174,937, column 49, line 53 to column 50, line 27, the entire disclosure of U.S. Pat. No. 6,174,937 being totally incorporated herein by reference, and the like, as well as mixtures thereof.

The ink disclosed herein can also contain other resins and waxes such as: Crodamide 203 (commercially available from Croda), Crodamide ORX (commercially available from Croda), Kemamide S-180 and E-180 (commercially available from Witco), Unislip 1750 (commercially available from Uniqema), Uniclear 80 (commercially available from Arizona), a dicapryladipate compatibilizer such as Arizona SP-100, Vybar 263 and 243 (commercially available from Baker Petrolite), 1-docosanol (commercially available from Aldrich), Unilin 700 (commercially available from Baker Hughes), Beeswax Cerra Bellina (commercially available from Kester), Siliconyl Beeswax (commercially available from Kester), stearyl alcohol 98 NF (commercially available from Kester), Kraton D1101 (commercially available from Kraton Polymers), synthetic paraffin wax of sharp melting point such as Callista 158 (commercially available from Shell), microcrystalline branched hydrocarbon waxes such as Microwax HG (commercially available from Paramelt), Mp=80-86 and Microwax P827, Kemamide S-221, polyethyleneglycol 400 distearate available (commercially available from Mosselman); paraffin waxes such as HNP-3,5,9,10,11 and HNP-12 (commercially available from Nippon Seiro Co), semi-crystalline wax such as HIMIC-2065 (commercially available from Nippon Seiro Co.); hydrogenated styrene-butadiene copolymers of low molecular weight such as Tuftec H1141.11102 (commercially available from Asahi Kasei Corp); ethylene-propylene copolymers such as EP-700 and EP-602 (commercially available from Baker Hughes); Unithox 420 Ethoxylate (commercially available from Baker Hughes); propylene-ethylene copolymer alcohols of melting point in the range of 65 to 100 C (commercially available from Baker Hughes); maleic anhydride mono-isopropyl maleate such as Ceramer 1251 (commercially available from Baker Hughes); alpha olefin-maleic anhydride polymer of melting point of about 80 degree C. (commercially available from Baker Petrolite) (X-5399); oxidized ethene homopolymer, Petrolite C-9500 (commercially available from Baker Hughes); Oxidized 1-propene with ethane, Cardis 314, (commercially available from Baker Hughes), Victory Amber wax (commercially available from Bareco), oxidized PE such as OX-020T (commercially available from Nippon Seiro Co.); paraffin wax, a straight chain hydrocarbon having a melting point of about 49 to 71 degree C.; microcrystalline wax is separated from asphalts and is higher in MW and more branched than the paraffin wax and having a melting point is between 60 and 89 degree C.

The ink carriers can also optionally contain a UV stabilizer. The UV stabilizer is in one embodiment at least about 0.001% by weight of the ink carrier, in another embodiment of at least about 0.5% by weight of the ink carrier, and in yet another embodiment of at least about 1% by weight of the ink carrier, and in one embodiment of equal to or less than about 5% by weight of the ink carrier, in another embodiment equal to or less than about 3% by weight of the ink carrier, and in yet another embodiment equal to or less than about 2% by weight of the ink carrier, although the amount can be outside of these ranges. Examples of suitable UV stabilizers include UVIMUL® (commercially available from BASF), Tinuvin 144, Tinuvin 111 FB and Tinuvin 622 FB (commercially available from Ciba Geigy), and the like. Additional suitable phase change ink carrier materials can include those found in U.S. Pat. No. 6,860,930, col. 19, lines 29-42, which is incorporated in its entirety by reference.

The phase change ink can be designed to delay the onset of oxidation itself. Thermal stability data were conducted using differential scanning calorimetry experiments performed under oxygen in the temperature range of about 160 to about 200 degrees C. Heat flow variations with time provides indication of the onset of degradation of the solid ink and the expected rate of degradation in units of W/g/min. Comparative experiments were conducted at 190 degrees C. regarding Onset of Degradation. Extrapolation of the stability data to lower temperature indicates substantial improvement in thermal stability could be achieved with the subject inks. The inks had an Onset of Degradation at 190 degrees C. in one embodiment of not less than about 3 minutes, in another embodiment not less than about 5 minutes, and in a further embodiment not less than about 10 minutes. Furthermore, these inks had a Rate of Degradation at 190 degrees C. in one embodiment equal to or less than about 0.05 wax/gram/minute, in another embodiment equal to or less than about 0.005 W/gram/minute, and in a further embodiment equal to or less than about 0.002 W/gram/minute.

The ink carrier can be present in the phase change ink prepared in one embodiment in an amount of at least about 50% by weight of the ink, in another embodiment of at least about 85% by weight of the ink, and in yet another embodiment of at least about 90% by weight of the ink, and in one embodiment equal to or less than about 95% by weight of the ink, in another embodiment equal to or less than about 99% by weight of the ink, and in yet another embodiment equal to or less than about 90% by weight of the ink, although the amount can be outside of these ranges.

In one specific embodiment, the ink carrier has a melting point of less than about 110° C., and in another embodiment of less than about 100° C., although the melting point of the ink carrier can be outside of these ranges.

The phase change ink compositions also contain a colorant. Any desired or effective colorant can be employed, including dyes, pigments, mixtures thereof, and the like, provided that the colorant can be dissolved or dispersed in the ink vehicle. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 commercially available from Crompton and Knowles, C.I. Disperse Yellow 238, Neptune Red Base NB543 (BASF, C.I. Solvent Red 49), Neopen Blue FF-4012 commercially available from BASF, Lampronol Black BR commercially available from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. Nos. 5,621,022 and 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, Copending application U.S. Ser. No. 10/260,146, filed Sep. 27, 2002, entitled "Colorant Compounds," and Copending application U.S. Ser. No. 10/260,379, filed Sep. 27, 2002, entitled "Methods for Making Colorant Compounds," the disclosures of each of which are totally incorporated herein by reference.

Other ink colors besides the subtractive primary colors can be desirable for applications such as postal marking, industrial marking, and labeling using phase change printing, and the inks are applicable to these needs. Further, infrared (IR) or ultraviolet (UV) absorbing dyes can also be incorporated into the inks for use in applications such as "invisible" coding or marking of products. Examples of such infrared and ultraviolet absorbing dyes are disclosed in, for example, U.S. Pat. Nos. 5,378,574, 5,146,087, 5,145,518, 5,543,177, 5,225,900, 5,301,044, 5,286,286, 5,275,647, 5,208,630, 5,202,265, 5,271,764, 5,256,193, 5,385,803, and 5,554,480, the disclosures of each of which are totally incorporated herein by reference.

In a specific embodiment, the colorant is an isocyanate-derived colored resin as disclosed in, for example, U.S. Pat. Nos. 5,780,528 and 5,919,839, the disclosures of each of which are totally incorporated herein by reference. In this embodiment, the colorant is the reaction product of a hydroxyl-substituted or primary or secondary amino-substituted chromophore with an isocyanate. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Specific examples of suitable isocyanates include those listed hereinabove as being suitable for reaction with the hydroxyl-substituted or amino-substituted antioxidant. Examples of suitable hydroxyl-substituted and primary or secondary amino-substituted chromophores include those disclosed in, for example, U.S. Pat. Nos. 3,157,633, 3,927,044, 3,994,835, 4,102,644, 4,113,721, 4,132,840, 4,137,243, 4,170,564, 4,284,729, 4,507,407, 4,640,690, 4,732,570, 4,751,254, 4,751,254, 4,761,502, 4,775,748, 4,812,141, 4,846,846, 4,871,371, 4,912,203, 4,978,362, 5,043,013, 5,059,244, 5,149,800, 5,177,200, 5,270,363, 5,290,921, and 5,731,398, the disclosures of each of which are totally incorporated herein by reference. Hydroxyl-containing and primary or secondary amino-containing colorants from the classes of Color Index (C.I.) Solvent Dyes, Disperse Dyes, modified Acid and Direct Dyes, Basic Dyes, Sulphur Dyes, Vat Dyes, and the like can also be used. These colorants can also affect the rheological properties of the inks containing them.

Pigments are also suitable colorants for the phase change inks. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast-Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as Regal 330® (Cabot), Carbon Black 5250, Carbon Black 5750 (Columbia Chemical), and the like.

The ink compositions in one embodiment have melting points of no lower than about 40° C., in another embodiment of no lower than about 60° C., and in yet another embodiment of no lower than about 70° C., and have melting points in one embodiment equal to or less than about 140° C., in another embodiment equal to or less than about 120° C., and in yet another embodiment equal to or less than about 100° C., although the melting point can be outside of these ranges.

The ink compositions generally have melt viscosities at the jetting temperature in one embodiment no lower than about 75° C., in another embodiment no lower than about 100° C., and in yet another embodiment no lower than about 120° C., and in one embodiment equal to or less than about 180° C., and in another embodiment equal to or less than about 150° C., although the jetting temperature can be outside of these ranges, in one embodiment of equal to or less than about 30 centipoise, in another embodiment of equal to or less than about 20 centipoise, and in yet another embodiment of equal to or less than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

The ink compositions can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring or milling until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In a specific embodiment, the intermediate transfer member is maintained at a temperature that enables the ink printed thereon to substantially become immobile upon contact with the intermediate transfer member. In one embodiment, the intermediate transfer member is heated to a temperature of from about 4° C. above to about 60° C. below the ink melting temperature, and in another embodiment, the intermediate transfer member is heated to a temperature of from about 2° C. above to about 50° C. below the ink melting temperature, although the temperature of the intermediate transfer member can be outside of these ranges. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments.

EXAMPLE 1

The ink compositions of Tables 1 and 2 were prepared in a 150 ml glass beaker by adding the respective amount of the component in parts by weight or equivalent percent by weight as herein described for the Cyan ink of Table 1 in the following order: (1) the polyethylene wax (PE 500, obtained from Baker Petrolite, Tulsa, Okla., a polyethylene homopolymer with an average chain length of C-36), (2) a linear primary long chain alcohol (UNILIN® 425, obtained from Baker Petrolite, Tulsa, Okla., with an average chain length of C-30), (3) a glycerol ester of hydrogenated (rosin) acid (KE-100, obtained from Arakawa Chemical Industries, Ltd, Osaka, Japan), (4) an alkylbenzyl phthalate of the formula

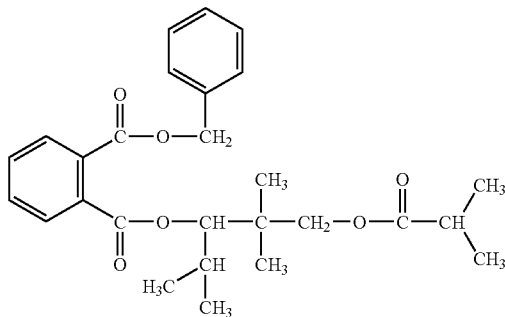

(SANTICIZER® 278, obtained from Ferro Corporation, Bridgeport, N.J.), (5) NAUGUARD® 445 antioxidant (obtained from Uniroyal Chemical Co., Middlebury, Conn.), (6) Ethanox 310 antioxidant (obtained from Albemarle, Baton Rouge, La., (7) a tetra amide resin obtained from the reaction of one equivalent of dimer acid with two equivalents of ethylene diamine and UNICID® 700 (obtained from Baker Petrolite, Tulsa, Okla., a carboxylic acid derivative of a long chain alcohol), prepared as described in Example 1 of U.S. Pat. No. 6,174,937, the disclosure of which is totally incorporated herein by reference (8) Uniclear 100 (obtained from Arizona Chemicals, Jacksonville, Fla.). The materials were melted together at a temperature of about 135° C. in a reaction block (from H+P Labortechnik GmbH, München) controlled with a Telemodel 40CT, and stirred for about 2 hours at about 500 rpm. To this mixture was then added (9) the cyan colorant disclosed in Example VIII of U.S. Pat. No. 6,472,523, the disclosure of which is totally incorporated herein by reference. The ink was stirred for about 2 additional hours and then cooled to room temperature. The cyan ink thus prepared exhibited a viscosity of about 11.2 centipoise as measured by Rheometrics Instrument RFS III viscometer at about 110° C. The ink thus formed was filtered through a heated MOTT® apparatus (obtained from Mott Metallurgical) using an NAE 0.2 micron filter under a pressure of about 15 pounds per square inch. The filtered phase change ink was poured in an aluminum mold and allowed to solidify to form an ink stick.

A low polarity color phase change ink set was formulated to fully demonstrate the advantages of the ink disclosed herein. The compositions of the cyan, magenta, yellow and process black inks of the ink set are set forth in Table 1. These inks were printed on papers in the temperature range of 105 to 120 degrees C. using a modified Xerox Phaser 860 printer, which uses an indirect printing process producing images having excellent print quality and robustness.

TABLE 1

Composition of Low Polarity Solid Inks

| Ink Components | Cyan wt % | Magenta wt % | Yellow wt % | Black wt % |
| --- | --- | --- | --- | --- |
| Polywax 500 | 39.18 | 38.46 | 39.17 | 37.67 |
| Unilin 425 | 35.46 | 34.81 | 35.45 | 34.1 |
| Uniclear 100 | 7.16 | 7.01 | 7.15 | 6.88 |
| KE-100 | 4.72 | 4.64 | 4.72 | 4.54 |
| Nauguard 445 | 0.13 | 0.13 | 0.13 | 0.12 |
| Ethanox 310 | 1.91 | 1.88 | 1.91 | 1.84 |
| Sanitizer 278 | 3.14 | 3.09 | 3.14 | 3.04 |
| Tetra Amide Resin | 3.96 | 3.65 | 4.97 | 3.52 |
| Yellow Dye* | 0 | 0 | 3.36 | 1.24 |
| Red Dye 1* | 0 | 4.36 | 0 | 3.02 |
| Red Dye 2* | 0 | 1.98 | 0 | 1.52 |
| Cyan Dye* | 4.35 | 0 | 0 | 2.5 |
| Total | 100 | 100 | 100 | 100 |

Yellow Dye* synthesized as described in U.S. Pat. No. 6713614
Red Dye 1* prepared as per U.S. Pat. No. 6860931
Red Dye 2* prepared as per U.S. Pat. No. 6821327
Cyan Dye* synthesized as described in U.S. Pat. No. 6472523

EXAMPLE 2

The same procedure of Example 1 was used for the preparation of the cyan inks formulations set forth in Table 2. A distilled Polywax 500, 10% by weight of the low end of the molecular weight distribution removed, obtained from Baker Petrolite, Tulsa, Okla., was employed in Sample# C.

TABLE 2

Composition and Physical Properties of Low Polarity Cyan Solid Inks

| Ink Components | A wt % | B wt % | C wt % | D wt % | E wt % | F wt % | G wt % | H wt % |
| --- | --- | --- | --- | --- | --- | --- | --- | --- |
| PE-500 | 46.24 | 37.93 | 0 | 37.93 | 35.95 | 36.38 | 35.95 | 35.95 |
| Unilin 425 | 30.4 | 37.87 | 37.87 | 37.87 | 39.72 | 35.89 | 37.32 | 37.32 |

TABLE 2-continued

Composition and Physical Properties of Low Polarity Cyan Solid Inks

| Ink Components | A wt % | B wt % | C wt % | D wt % | E wt % | F wt % | G wt % | H wt % |
|---|---|---|---|---|---|---|---|---|
| Uniclear 100 | 10 | 7.86 | 7.86 | 7.86 | 8.37 | 8.37 | 7.36 | 8.37 |
| KE-100 | 5 | 4.57 | 4.57 | 4.57 | 5.07 | 5.07 | 4.07 | 5.07 |
| Tetra amide Resin | 3.1 | 2.56 | 2.56 | 2.56 | 3.56 | 3.56 | 3.56 | 1.56 |
| Sanitizer 278 | 2 | 3.04 | 3.04 | 3.04 | 1.04 | 5.04 | 5.04 | 5.04 |
| Nauguard 445 | 0.26 | 0.12 | 0.12 | 0.12 | 0.12 | 0.12 | 0.12 | 0.12 |
| Ethanox 310 | 0 | 1.85 | 1.85 | 1.85 | 1.96 | 1.36 | 2.35 | 2.35 |
| Distilled PW500, X-1182 | 0 | 0 | 37.93 | 0 | 0 | 0 | 0 | 0 |
| Cyan Dye | 3 | 4.21 | 4.21 | 4.21 | 4.21 | 4.21 | 4.21 | 4.21 |
| Total | 100 | 100 | 100.01 | 100.01 | 100 | 100 | 100 | 100 |

These inks were printed on papers in the temperature range of 105 to 120 degrees C. using a modified Xerox Phaser 860 printer, which uses an indirect printing process producing images having excellent print quality and robustness.

The ink as disclosed herein, Ink B, was found to be stable at 130 degrees C., showed no phase separation, had good filterability characteristics and excellent thermal stability, as determined by accelerated aging studies at high temperatures under oxygen atmosphere (DSC). Table 3 summarizes the critical stability data obtained from DSC studies (onset and rate of degradation). It also includes the jetting temperature for Ink B as compared to commercial ink used in a modified Xerox® 860 printer and Ink A, an ink containing no hindered phenol additive.

TABLE 3

DSC (Onset and rate of degradation in Oxygen atmosphere) and Jetting Temperature Data.

| | Jetting Temperature | Onset @ 190° C. (min) | Rate @ 190° C. (W/g/min) |
|---|---|---|---|
| Conventional Ink | 140° C. | 2.3 | 0.251 |
| Ink A | 110° C. | 2.2 | 0.086 |
| Ink B | 109° C. | 66.1 | 0.001 |

Ink B did not exhibit an onset of oxidation at 190° C. for 66.1 minutes even though this ink composition was able to operate at a jetting temperature of 109° C. Conversely, the higher jetting temperature commercial ink and Ink A had an onset of oxidation at 190° C. in 2.3 and 2.2 minutes, respectively. As for the Rate of Degradation at 190° C., Ink B was only 0.001 W/g/min, while the commercial ink and Ink B had Rates of 0.251 and 0.086 W/g/min, respectively.

No significant changes in the filtration characteristics as measured by the method described in U.S. Pat. No. 6,858,070, column 28, line 25, but with aliquots of 40 g, were detected. The heat stability factor obtained from the filtration data of Ink A and Ink B was about 1 demonstrating that these inks are substantially resistant to phase separation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An ink carrier comprising (A) an antioxidant mixture comprising (a) a hindered phenol antioxidant, and (b) a hindered amine antioxidant, (B) a polyalkylene wax, (C) a functional wax having a hydroxyl number of at least about 20 to equal to or less than about 100, and (D) an ester-terminated polyamide in an amount ranging from at least about 0.5% by weight to about 20% by weight, said low polarity ink carrier being substantially resistant to phase separation, having excellent thermal stability, resisting autocatalytic degradation of the ink composition and a substantial color shift upon standing, and providing enhanced humidity resistance, said low polarity ink having a substantially low surface energy.

2. A phase change ink comprising a colorant and the ink carrier according to claim 1.

3. An ink carrier according to claim 1, wherein the hindered phenol antioxidant is present in the low polarity ink carrier in an amount of at least about 0.01% and wherein the hindered phenol antioxidant is present in the low polarity ink carrier in an amount equal to or less than about 4% by weight.

4. An ink carrier according to claim 1, wherein the hindered amine antioxidant is present in the low polarity ink carrier in an amount of at least about 0.001% and wherein the hindered amine antioxidant is present in the low polarity ink carrier in an amount equal to or less than about 0.5% by weight.

5. An ink carrier according to claim 1, having a surface energy equal to or less than about 33 dynes/cm.

6. An ink carrier according to claim 1, wherein the weight ratio of hindered phenol antioxidant to hindered amine antioxidant is at least about 2 and is equal to or less than about 40.

7. An ink carrier according to claim 1, wherein the total amount of the antioxidant mixture in the ink is equal to or less than about 5 weight % based on the total weight of the ink.

8. An ink carrier according to claim 1, wherein the functional wax is present in the low polarity ink carrier in an amount of at least about 20% and equal to or less than about 65% by weight.

9. An ink carrier according to claim 1, wherein the melting point of the alcohol wax is at least about 50 degrees C.

10. An ink carrier according to claim 1, wherein the polyalkylene wax is present in the low polarity ink carrier in an amount of at least about 25% and equal to or less than about 65% by weight.

11. An ink carrier according to claim 1, which, in the presence of oxygen, has a Onset of Degradation at 190° C. of equal to or less than about 3 minutes.

12. An ink carrier according to claim 1, which, in presence of oxygen, has a Rate of Degradation at 190° C. of equal to or less than about 0.05 W/gram/minute.

13. An ink carrier according to claim 1, wherein at least about 85 percent by weight of the ink carrier has a total solubility parameter equal to or less than about 19 $(MPa)^{0.5}$.

14. An ink carrier according to claim 13, wherein the value for the polar component of the total solubility parameter is equal to or less than about 2 $(MPa)^{0.5}$.

15. A method for producing a low energy phase change ink composition comprising combining together (1) a low polarity ink carrier comprising (A) an antioxidant mixture comprising (a) a hindered phenol antioxidant, and (b) a hindered amine antioxidant, (B) a polyalkylene wax, (C) an alcohol wax having a hydroxyl number of at least about 20 to equal to or less than about 100, and (D) an ester-terminated polyamide in an amount ranging from at least about 0.5% by weight to about 20% by weight, said low polarity ink carrier being substantially resistant to phase separation, having excellent thermal stability, resisting autocatalytic degradation of the ink composition and a substantial color shift upon standing, and providing enhanced humidity resistance, said low polarity ink having a substantially low surface energy; and (2) a colorant.

16. A method according to claim 15, wherein the surface energy of the low energy phase change ink produced thereby is equal to or less than about 33 dynes/cm.

17. A method according to claim 15, wherein the ink produced thereby, in the presence of oxygen, has an Onset of Degradation at 190° C. equal to or less than about 3 minutes.

18. A method according to claim 15, wherein the ink produced thereby, in the presence of oxygen, has a Rate of Degradation at 190° C. equal to or less than about 0.05 W/gram/minute.

19. A method according to claim 15, wherein at least about 85 percent by weight of the ink carrier produced thereby has a total solubility parameter of at least about 19 $(MPa)^{0.5}$ and a value for the polar component of the total solubility parameter equal to or less than about 2 $(MPa)^{0.5}$.

20. A method which comprises incorporating into an ink jet printing apparatus a low energy phase change ink composition comprising (1) a low polarity ink carrier comprising (A) an antioxidant mixture comprising (a) a hindered phenol antioxidant, and (b) a hindered amine antioxidant, (B) a polyalkylene wax, (C) an alcohol wax having a hydroxyl number of at least about 20 to equal to or less than about 100, and (D) an ester-terminated polyamide in an amount ranging from at least about 0.5% by weight to about 20% by weight, said low polarity ink carrier being substantially resistant to phase separation, having excellent thermal stability, resisting autocatalytic degradation of the ink composition and a substantial color shift upon standing, and providing enhanced humidity resistance, said low polarity ink having a substantially low surface energy, and (2) a colorant; melting the low energy phase change ink composition; and causing droplets of the melted ink to be ejected at a temperature up to about 130 degrees C. and not less than about 80 degrees C. in an imagewise pattern onto a substrate.

21. A method according to claim 20, wherein the substrate is a final recording sheet and droplets of the melted ink are ejected in an imagewise pattern directly onto the final recording sheet.

22. A method according to claim 20, wherein the substrate is an intermediate transfer member and droplets of the melted ink are ejected in an imagewise pattern onto the intermediate transfer member followed by transfer of the imagewise pattern from the intermediate transfer member to a final recording sheet.

23. A method according to claim 22, wherein the intermediate transfer member is heated to a temperature above that of the final recording sheet and below that of the melted ink in the printing apparatus.

* * * * *